US010077176B2

(12) United States Patent
Herre et al.

(10) Patent No.: US 10,077,176 B2
(45) Date of Patent: Sep. 18, 2018

(54) DRIVER-FREE TRANSPORT VEHICLE FOR THE TRANSPORTATION OF HEAVY LOADS ON CARRIAGES AND METHOD FOR OPERATING THE TRANSPORT VEHICLE

(71) Applicant: GRENZEBACH MASCHINENBAU GMBH, Asbach-Bäumenheim (DE)

(72) Inventors: Erwin Herre, Buchdorf (DE); Sigfried Mecklinger, Buchdorf (DE); Rüdiger Geiger, Genderkingen (DE); Bernd Vogt, Meitingen (DE)

(73) Assignee: GRENZEBACH MASCHINENBAU GMBH, Asbach-Baeumenheim (DE)

( * ) Notice: Subject to any disclaimer, the term of this patent is extended or adjusted under 35 U.S.C. 154(b) by 0 days.

(21) Appl. No.: 15/036,239

(22) PCT Filed: Dec. 9, 2014

(86) PCT No.: PCT/DE2014/000627
§ 371 (c)(1),
(2) Date: May 12, 2016

(87) PCT Pub. No.: WO2015/085985
PCT Pub. Date: Jun. 18, 2015

(65) Prior Publication Data
US 2016/0297653 A1 Oct. 13, 2016

(30) Foreign Application Priority Data

Dec. 12, 2013 (DE) .................. 10 2013 020 851

(51) Int. Cl.
*B66F 9/06* (2006.01)
*G05D 1/02* (2006.01)
*B60L 11/18* (2006.01)

(52) U.S. Cl.
CPC ............. *B66F 9/063* (2013.01); *B60L 11/182* (2013.01); *G05D 1/0248* (2013.01); *G05D 2201/0216* (2013.01)

(58) Field of Classification Search
CPC ....... B21C 47/24; B60L 11/182; A63H 19/30; H04N 5/23203; B66F 9/06; G05D 1/02; B65H 7/00; B66C 1/66
(Continued)

(56) References Cited

U.S. PATENT DOCUMENTS 4,357,875 A * 11/1982 Scheel .................. B61J 1/10
104/166
4,706,772 A * 11/1987 Dawson .............. G05D 1/0242
180/167
(Continued)

FOREIGN PATENT DOCUMENTS

CN 202294611 7/2012
DE 10229036 1/2004
(Continued)

OTHER PUBLICATIONS

Gunter Ullrich, "Geschichte der Fahrerlosen Transportsysteme" Springer Fachmedien Wiesbaden GmbH: Vieweg + Teubner Verlag, 2011, ISBN 978-3-8348-0791-5. English translation of German Office Action dated Dec. 18, 2014, received in corresponding German Application No. 10 2013 020 851.3, discussing Ullrich (D2) on p. 5.

*Primary Examiner* — Anne Marie Antonucci
*Assistant Examiner* — Sanjeev Malhotra
(74) *Attorney, Agent, or Firm* — Duane Morris LLP; Jason M. Nolan; Gregory M. Lefkowitz

(57) ABSTRACT

The invention relates to a device and method for operating a driver-free transport vehicle for transporting heavy loads which are in the form of loaded carriages which can be moved on four castors, comprising the following character-
(Continued)

istics: a) a vehicle housing having a central lifting mandrel, a left lifting mandrel and a right lifting mandrel are used for receiving and transporting a carriage by means of a docking traverse integrated into the carriage, said vehicle housing being provided with two drive wheels mounted on both sides of the vehicle housing in the center thereof, and are driven individually by a drive system respectively on a separate rotational axis, b) the lowering of the vehicle housing to below a carriage, the determination of the openings of the docking traverse and the driving of the lifting mandrel, the left lifting mandrel and the right lifting mandrel, the orientation being determined by means of at least one laser scanner, c) the transport of the carriage, the release of the connection of the vehicle housing from the carriage.

8 Claims, 7 Drawing Sheets

(58) Field of Classification Search
USPC .......... 104/53, 130.02; 49/325; 348/722; 271/3.16; 212/283; 172/821; 246/186; 1/1
See application file for complete search history.

(56) References Cited

U.S. PATENT DOCUMENTS

| | | | |
|---|---|---|---|
| 4,823,901 A * | 4/1989 | Harding | B60T 7/22 180/167 |
| 5,542,356 A * | 8/1996 | Richert | B60L 11/182 104/130.02 |
| 5,999,866 A | 12/1999 | Kelly et al. | |
| 8,360,165 B2 * | 1/2013 | Leith | A01B 59/06 172/821 |
| 2006/0210382 A1 * | 9/2006 | Mountz | B60D 1/465 414/498 |
| 2007/0011946 A1 * | 1/2007 | Mullen | E05F 15/665 49/325 |
| 2007/0107620 A1 * | 5/2007 | Wagner | A63H 19/30 104/53 |
| 2008/0166217 A1 | 7/2008 | Fontana | |
| 2008/0316368 A1 * | 12/2008 | Fritsch | H04N 5/23203 348/722 |
| 2010/0052237 A1 * | 3/2010 | Herczeg | B65H 7/00 271/3.16 |
| 2011/0049076 A1 * | 3/2011 | Wehrli | B66C 1/66 212/283 |
| 2013/0166108 A1 | 6/2013 | Sturm | |
| 2013/0177379 A1 | 7/2013 | Hoffman et al. | |
| 2013/0206923 A1 * | 8/2013 | Gatterbauer | B21C 47/24 246/186 |
| 2016/0288687 A1 * | 10/2016 | Scherle | B66F 9/063 |
| 2017/0225602 A1 * | 8/2017 | Corrigan | B60P 1/52 |

FOREIGN PATENT DOCUMENTS

| | | |
|---|---|---|
| DE | 102004047214 | 3/2006 |
| DE | 102007002242 | 7/2008 |
| DE | 102008042315 | 4/2010 |
| DE | 102010062549 | 6/2012 |
| DE | 202013007279 | 11/2013 |
| EP | 192402 | 8/1986 |
| WO | 2006087542 | 8/2006 |

\* cited by examiner

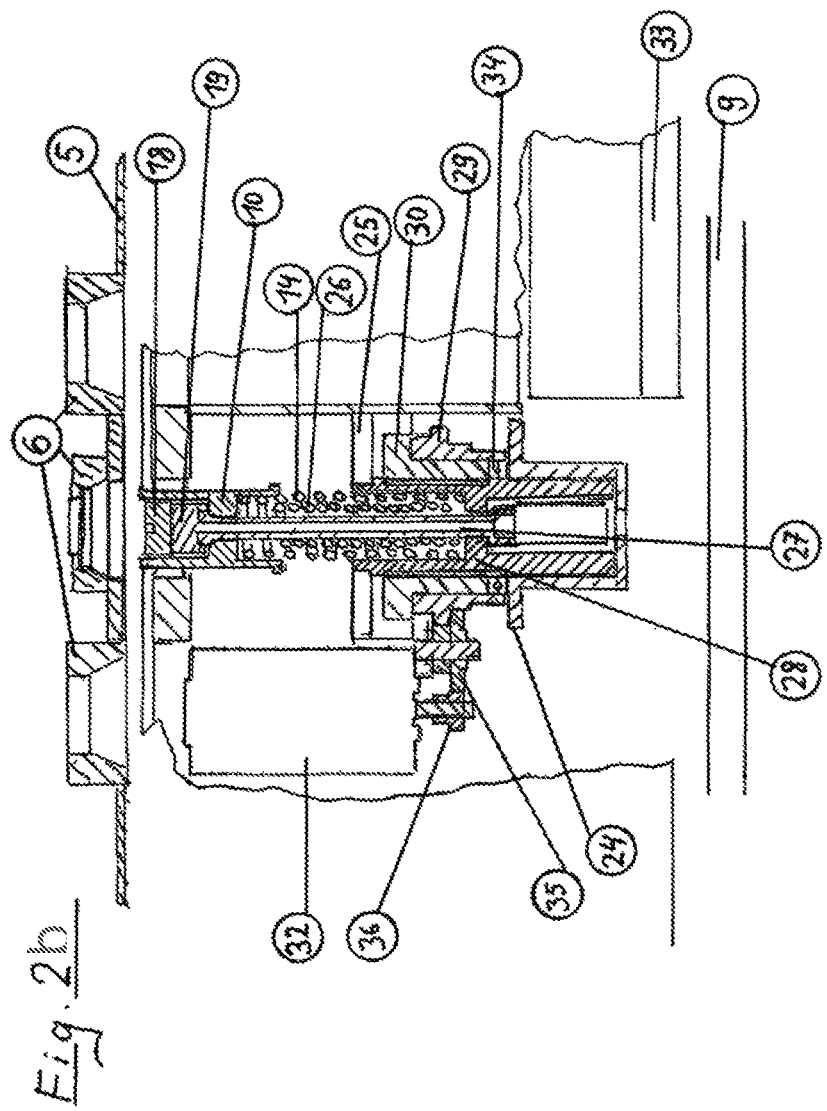

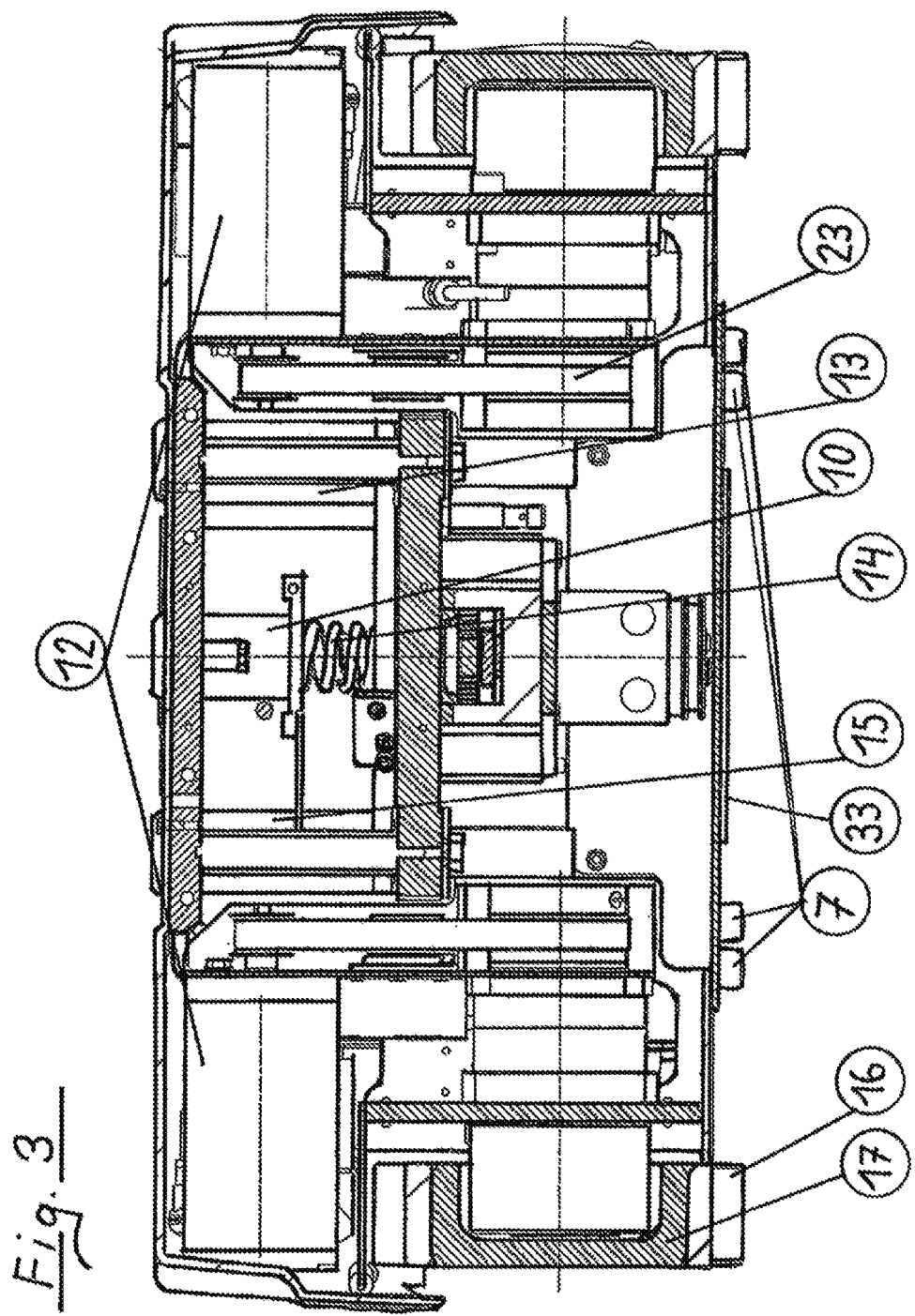

DRIVER-FREE TRANSPORT VEHICLE FOR THE TRANSPORTATION OF HEAVY LOADS ON CARRIAGES AND METHOD FOR OPERATING THE TRANSPORT VEHICLE

CROSS-REFERENCE TO RELATED APPLICATIONS

This application is a § 371 national stage entry of International Application No. PCT/DE2014/000627, filed Dec. 9, 2014, which claims priority to German Patent Application No. 10 2013 020 851.3 filed Dec. 12, 2013, the entire contents of which are incorporated herein by reference.

The invention relates to a driverless transport vehicle for the transportation of heavy loads on carriages, and to a method for operating the transport vehicle.

The requirement of short throughput times, low inventory, and high flexibility in production and distribution operations has existed for many years. Various types of organizational measures and the employment of technical means are required in order for these objectives to be met. Within the remit of operational logistics, it is the processes and the operating resources of intra-plant material flow that have to be designed in a suitable manner. Transporting, that is to say the targeted locational modification of goods, is an important process in the material flow. An operating resource which because of its universal application potential is used to this in many enterprises is the conventional fork-lift truck or the fork-lift carriage.

Automation of the transport process is enabled by installing driverless transport systems.

Driverless transport systems are intra-plant transport systems having automatically controlled vehicles which serve in transporting materials.

A system, in particular a driverless transport vehicle for the transportation of loads on undulated ground, in particular on a floor, is known in the prior art from DE 10 2007 002 242 A1.

This system is intended to refine an existing system, in particular a driverless transport vehicle, the system intended to be readily usable on various types of ground.

This system comprises at least one primary conductor and a vehicle which is capable of being supplied therefrom in a non-contacting manner, said vehicle comprising a secondary coil which is inductively coupled to the primary conductor. The secondary coil here is assigned a capacity in such a manner that the associated resonance frequency substantially corresponds to the medium frequency in particular between 10 and 100 kHz of the current embedded in the primary conductor, wherein a spring means is disposed between the drive unit, comprising in each case a drive wheel and the associated drive, and the linkage of the vehicle.

Furthermore, a method for navigating transport vehicles is known from DE 10 2004 047 214 A1, said method comprising the following steps:

determining the position of the transport vehicle and analyzing a scenario by means of complex 3D distance data. Furthermore identifying at least one target object and free spaces in the scenario. The method furthermore comprises calculating an associated docking vector from the determined position of the transport vehicle to the target object via a free space, and planning a path to the target object via the free space. The method furthermore comprises detecting simple 2D or 3D features of the previously identified target object, so as to calculate, in a cyclical manner while travelling, new position information of the transport vehicle and to execute the previously established plan for reaching the target. A method for image-supported navigation for autonomous and semi-autonomous transport vehicles that represents a reliable and readily implementable method is intended to be achieved in this publication.

It is the object of the present invention to provide an autonomous transport vehicle by way of which the rapid transportation of load shelves having loads up to more than 1000 kg may be executed in an interference-free manner in large factory sheds, even in the case of slight inclinations.

This object is achieved by a device according to claim 1: A driverless transport vehicle for the transportation of heavy loads in the form of loaded carriages which are movable on casters, the transport vehicle having the following features:

a) a vehicle housing (38) having a central lifting pin (10), a left lifting pin (15), and a right lifting pin (13) for receiving and transporting a carriage (1) by means of a docking cross beam (5) which is integrated in the carriage (1), having two drive wheels (8) which, each on a dedicated mounted rotation axle, are separately driven on either side of the center of the vehicle housing (38) by one drive (12) each, wherein a rotary encoder (37) is provided on each drive wheel (8), and wherein support wheels (7) in each case in pairs are provided on the front side and on the rear side of the vehicle housing;

b) a drive motor (32) for driving a lifting spindle (28) which by means of a pressure spring (14) presses the central lifting pin (10) into a central opening of the docking cross beam (5), and by means of a pressure plate (25) presses the left lifting pin (15) and the right lifting pin (13) into respective further openings of the docking cross beam (5);

c) a system for supplying energy to the transport vehicle by means of an induction current pick-up (33) by way of inductive lines which are installed in the floor;

d) at least one laser scanner (2) in the external region of the vehicle housing.

claim 2: The transport vehicle as claimed in claim 1, characterized in that the pressure spring (14) concentrically encloses a further, internal pressure spring (26) which enables high contact pressure on the carriage (1).

claim 3: The transport vehicle as claimed in claim 1 or 2, characterized in that the docking cross beam (5) has a docking cross brace (6) which enables receiving of the carriage (1) in a position of the vehicle that is rotated about a right angle.

claim 4: The transport vehicle as claimed in one of the preceding claims, characterized in that in the case of an expedient brief and temporally limited acceleration from standstill, a sensor enables the acceleration to be measured and thus, while considering specific parameters, allows conclusions relating to the accelerated mass to be drawn.

claim 5: The transport vehicle as claimed in one of the preceding claims, characterized in that a camera (11) for detecting the floor structure serves for determining the speed of the transport vehicle, and said camera (11) in conjunction with a rotary encoder (37) on each drive wheel (8) enables the slippage on each drive wheel (8) to be calculated.

claim 6: A method for operating a driverless transport vehicle for the transportation of heavy loads in the form of loaded carriages which are movable on casters, the method having the following features:

a) using a vehicle housing (38) having a central lifting pin (10), a left lifting pin (15), and a right lifting pin (13) for receiving and transporting a carriage (1) by means of a docking cross beam (5) which is integrated in the carriage (1), having two drive wheels (8) which, each on a dedicated mounted rotation axle, are separately driven on either side of the center of the vehicle housing (38) by one drive (12) each;
b) moving the vehicle housing (38) below a carriage (1), determining openings in the region of the docking cross beam (5), and deploying the lifting pin (10), the left lifting pin (15), and the right lifting pin (13) into these openings, at least one laser scanner (2) serving for orientation;
c) transporting the carriage (1) onward to the destination, releasing the mechanical connection between the vehicle housing (38) and the carriage (1).

claim 7: The method as claimed in claim 6, characterized in that the contact pressure of the lifting pins (10, 15, 13) depends on the payload of the carriage (1).

claim 8: The method as claimed in claim 6 or 7, characterized in that the docking cross beam (5) has a docking cross brace (6) which allows alignment of a carriage (1) in two mutually perpendicular directions.

claim 9: The method as claimed in one of claims 6 to 8, characterized in that the payload of a carriage (1) is determined by means of an acceleration sensor and of brief acceleration taking place under defined conditions.

claim 10: The method as claimed in one of claims 6 to 9, characterized in that a camera (11) for detecting the floor structure serves for determining the speed of the transport vehicle, and said camera (11) in conjunction with a rotary encoder (37) on each drive wheel (8) enables the slippage on each drive wheel (8) to be calculated.

claim 11: A computer program having a programming code for carrying out the method steps as claimed in one of claims 6 to 10, if the program is executed using a computer.

claim 12: A machine-readable carrier having the programming code of a computer program for carrying out the method as claimed in one of claims 6 to 10, if the program is executed using a computer.

The device according to the invention will be described in more detail hereunder. In the figures, and in detail:

FIG. 2b shows a cross section from a region of the central lifting pin 10;

FIG. 3 shows a cross section through a transport vehicle 4 in the docking region;

Figure 1:
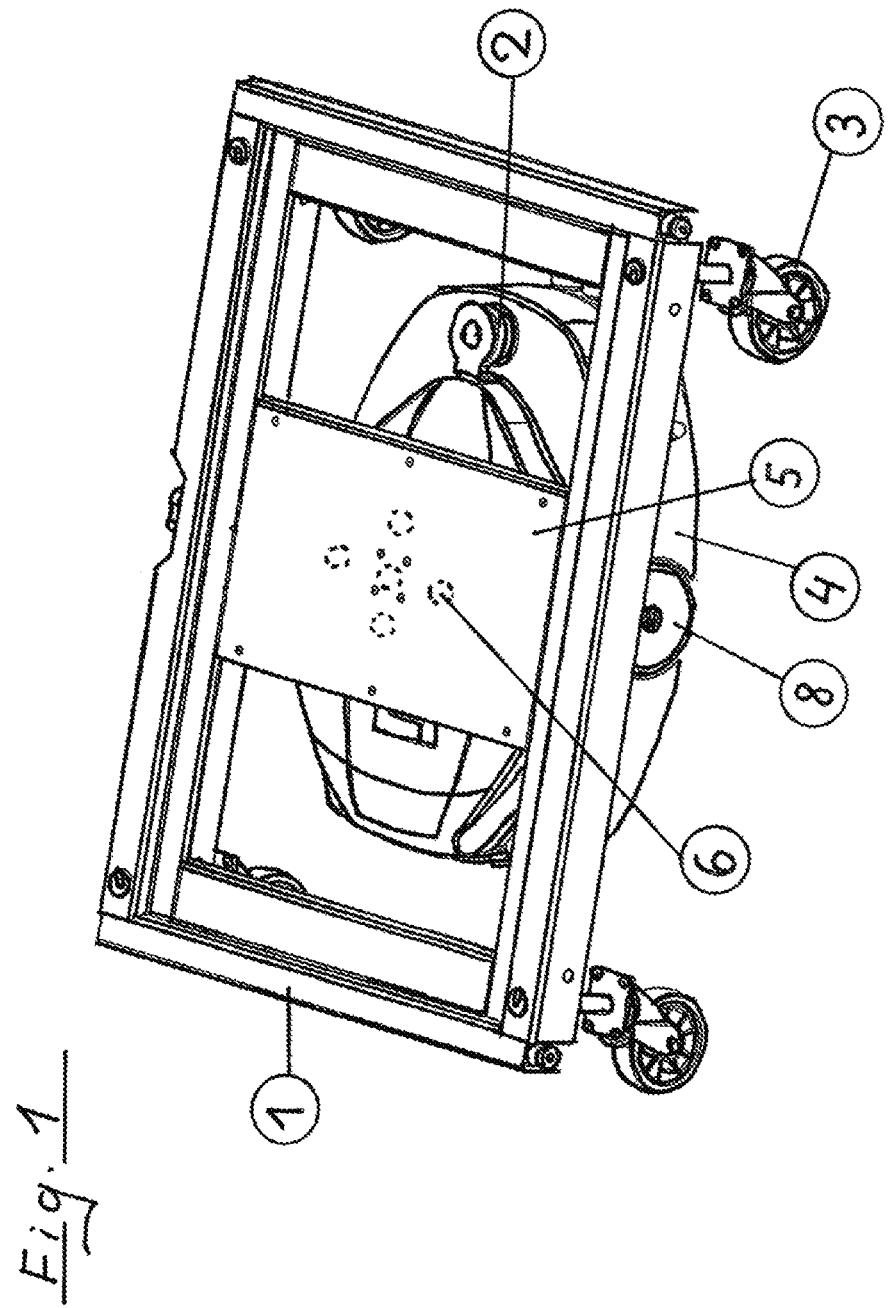
FIG. 1 shows a perspective plan view of a transport vehicle 4.

FIG. 1 shows a perspective plan view of a transport vehicle 4 having a carriage 1 bearing thereon. The carriage 1, in the region of the center of gravity thereof, is connected to a rectangular docking cross beam 5 which, in the point of intersection of the face diagonals thereof, has a bore which, in the direction of the longitudinal side of the this rectangle and in the direction of the transverse side, is on either side accompanied by each one other bore. These five bores form a cross brace which is referred to as the docking cross brace 6, since the transport vehicle 1 has means by way of which a force-fitting connection as a docking facility to the carriage 1 is established by plugs in the form of three lifting pins, which slide into these bores. The centers of these three lifting pins, that is to say of a left, of a central, and of a right lifting pin, lie on one line, the central lifting pin penetrating the bore in the point of intersection of the face diagonals of the docking cross beam 5. Since the five bores described allow docking of the three docking pins in two directions which are mutually perpendicular, the transport vehicle 4 is capable of receiving a carriage 1 in the longitudinal direction or in the transverse direction. A laser scanner on the upper front side of the transport vehicle 4 shown, that serves for orientation, is referenced as 2. The right drive wheel of the transport vehicle 4, that is visible here, is referenced as 8, and the casters of the carriage 1 are referenced as 3.

Figure 2A:
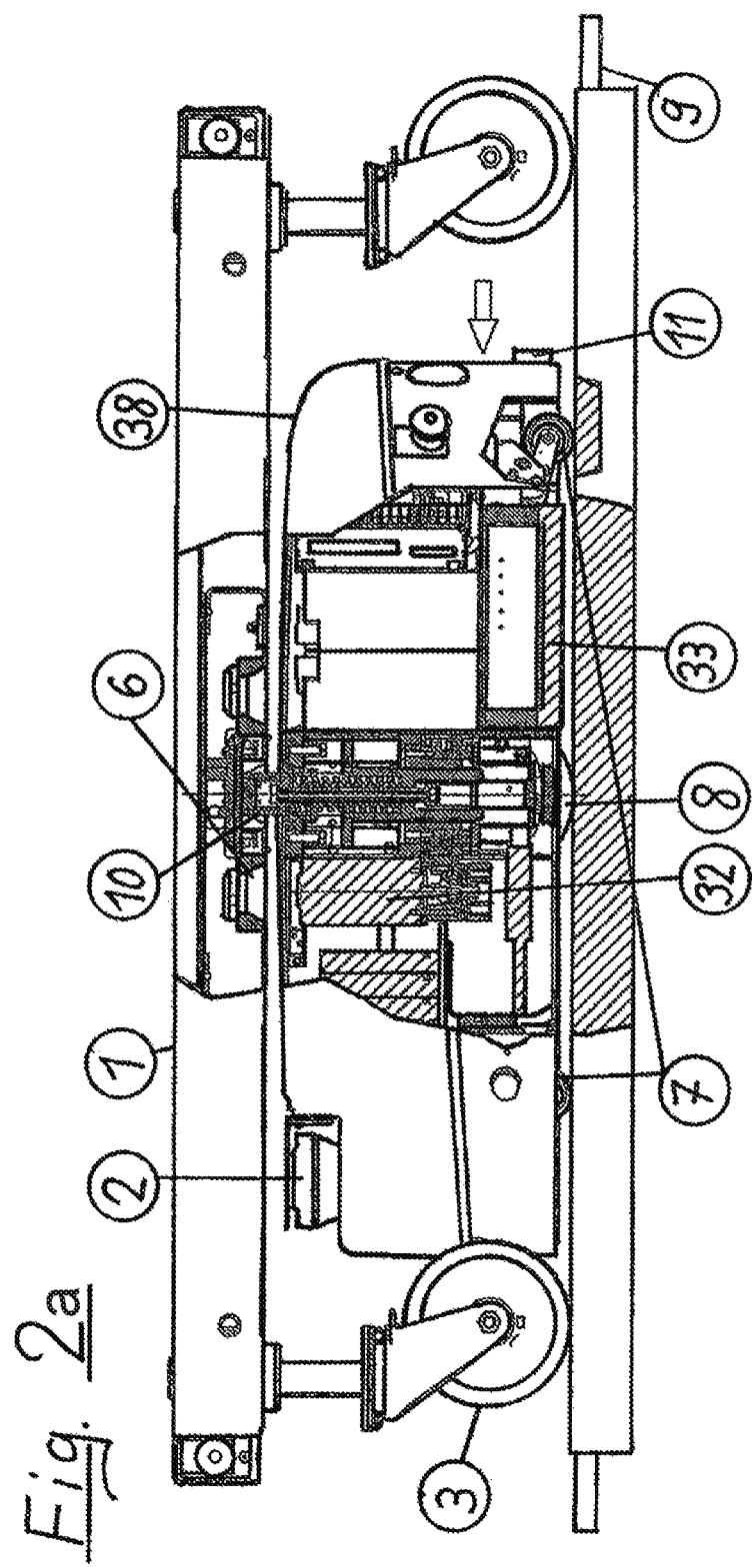
FIG. 2a shows a longitudinal section through a transport vehicle 4.

FIG. 2a shows a longitudinal section through a transport vehicle having a vehicle housing 38 in an assembly with a carriage 1. A front and a rear caster 3 can be seen on the carriage 1 in this illustration. Furthermore, the right drive wheel 8 and in each case one support wheel 7 are illustrated on the lower side of the transport vehicle, the rear support wheel 7 being without cladding. An induction current pick up 33 is fitted to the lower side of the transport vehicle, said induction current pick up 33 in conjunction with an induction line 9 which is installed in the floor ensuring the current supply to the transport vehicle. A laser scanner 2 which may be complemented by further laser scanners can be seen on the front side of the transport vehicle.

A camera 11 for detecting the floor structure is installed on the rear side of the vehicle housing 38. Cameras for tracking and safety-relevant ultrasonic sensors are not illustrated in this FIG. 2a.

The central part of the transport vehicle that is drawn in a sectional manner shows the region around a lifting pin 10 and a drive motor 32 for a lifting spindle 28 which is still to be described in more detail below. Furthermore, the docking cross brace 6 is referenced in this sectioned part, in the region of the carriage 1.

FIG. 2b shows a cross section from the region of the central lifting pin 10. For the sake of clarity, the central lifting mechanism of the transport vehicle has been drawn separately and free of all obscuring covers. The docking cross beam 5 which communicates with the transport vehicle is illustrated here with the docking cross brace 6 of the carriage in the upper part of this figure. The contact between the transport vehicle and the docking cross beam 5 of the carriage here is shown by means of the central lifting pin 10 being pushed vertically upward.

The lifting pin 10 rests on the upper part of an external pressure spring 14 which concentrically surrounds an internal pressure spring 26, both pressure springs 14 and 26 being guided by a guide tube 27 which runs in the longitudinal axis of said pressure springs 14 and 26. This guide tube 27, at the upper side thereof, widens to form a round contact plate 19 which adjoins a contact plate 18 of the carriage, said guide tube 27 being displaceably mounted in the lifting pin 10. This guide tube 27, at the lower side, widens to form a round contact plate which is not referenced in more detail and which delimits an upward movement of the guide tube 27 on a locking mechanism of a lifting spindle 28 which will be described below.

The lifting pin 28 is a cylindrical component which is vertically mounted and in an upper region, in a vertical and concentric clearance, represents the mounting of the external pressure spring 14 and of the inner pressure spring 26, the two moving inside one another about the guide tube 27.

A spindle nut 30 is concentrically disposed about an external thread which is machined into the entire length of the lifting spindle 28, so as to engage in this external thread, said spindle nut 30 being able to be moved vertically upward in this external thread by means of a gear wheel 29 which is likewise concentrically mounted about the lifting spindle 28.

Driving the gear wheel 29 is performed by means of a drive motor 32, the drive sprocket 36 thereof by means of reduction gear wheels 35 being engaged in the gear wheel 29. The spindle nut 30 in its vertical movement at the lower end is delimited by a thrust bearing 34 of the housing 24 of said spindle nut 30.

The spindle nut 30 in its vertical upward movement meets a stop on the upper plate of the housing 24. The vertical movement of the lifting spindle 28 is performed by the pressure plate 25 by turning the spindle nut 30. The pressure plate 25 serves the upward movement of the left and of the right lifting pin toward the docking cross beam. The upward movement of the lifting pin 10 is performed by way of the lifting spindle 28 having the pressure spring 14 which presses on the lifting pin 10 and which in terms of the length thereof is delimited by the guide tube 27.

The downward movement of the lifting spindle 28 with the pressure plate 25 and the external lifting pins 16 and 13 is performed by turning the spindle nut 30 in the opposite direction. By lowering the lifting spindle 28 further, the lower delimitation of the guide tube 27 abuts an annular locking mechanism which is provided in the interior of the lifting spindle 28. On account thereof, the pressure spring 14 is delimited, the lifting pin 10 being imparted a downward movement by further lowering of the lifting spindle 28. The lifting pin 10 is thus released from the docking cross beam 5 as the last of the lifting pins. (Safety in the case of an emergency stop).

Employment of the two pressure springs 14 and 26 enables the pressure by way of which the central lifting pin 10 supports the carriage to be designed in a variable manner. For example, in this way the pressure which is exerted by way of the external pressure spring on the docking cross beam, and thus on the carriage, may be varied between a payload rating of zero and 400 kp. If the pressure is further increased, the internal pressure spring which allows the pressure force to be modified between a payload rating of 400 kp and 1000 kp, for example, is employed.

In this way, the proportion of the payload on the carriage to be transported that bears on the drive wheels of the transport vehicle may be adapted to the respective circumstances of the floor. Indeed, in this way the drive output of the transport vehicle may not only be adapted to the entire payload to be transported but also to the floor conditions and to the loading capability of the drive wheels. These measures have a significant influence on the braking behavior of the loaded transport vehicle. Using the system described, upward or downward inclines of the floor area of up to 5% may be overcome. The induction line 9 and the associated induction current pick-up 33 are known from FIG. 2a.

FIG. 3 shows a cross section through a transport vehicle 4 in the docking region. In this illustration, in the upper region of the transport vehicle, the drive 12 for a drive wheel is shown in each case on the left and on the right side, the drive wheel rim 17 and the drive wheel tire 16 of said drive wheel being identifiable on the left side. Driving the two drive wheels is in each case performed by means of a timing belt 23 leading from the drive 12 to the wheel axle of the respective drive wheel. One pair of support wheels 7 can be seen in each case to the left and to the right of the center on the lower side of the transport vehicle shown. The induction current pick up 33 can also be seen again in this region.

The central lifting pin 10 having the external pressure spring 14 which moves the former, and the left lifting pin 15 and the right lifting pin 13 to the left and to the right of said central lifting pin 10, can be seen in the cross section in the center of the transport vehicle in this FIG. 3.

Figure 4:
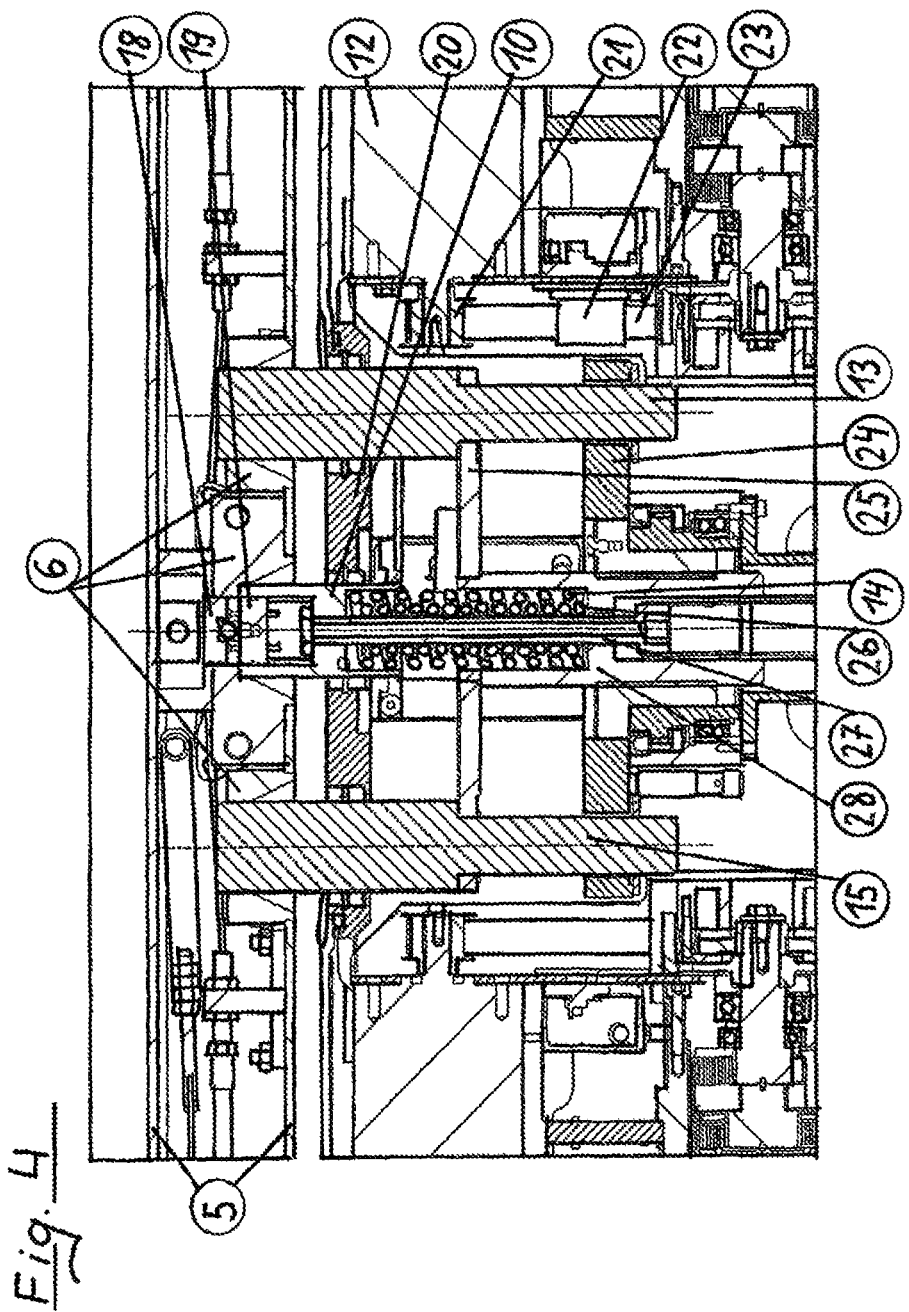
FIG. 4 shows a cross section of the docking region in the case of an established connection.

FIG. 4 shows a cross-section of the docking region in the case of a connection between the transport vehicle and the carriage having been established.

The left lifting pin 15 and the right lifting pin 13 can be seen in this illustration to the left and to the right of the center having the central lifting pin 10, the guide tube 27, and the internal pressure spring 26 and the external pressure spring 14 which are mounted about the guide tube 27. Moreover, the lifting spindle 28 with the housing 24 thereof, and the pressure plate for the left and the right lifting pin can be clearly seen here. The position of the left and of the right lifting pin corresponds to the position of a carriage without a load. Only the external pressure spring 14 is stressed, the spacing between the pressure plate 25 and the housing 24 therefore being relatively small.

While the weight of an empty carriage 1 is approximately 80 kp, the pressure of the lifting pin 10 acting on the carriage is approximately 40 kp. This pressure is maintained up to a payload on the carriage of approximately 400 kp.

In the case of a payload of the carriage between 400 kp to approximately 1000 kp, the pressure of the lifting pin 10 acting on the carriage is approximately 200 kp. In this way it is avoided that the carriage is lifted when empty and that the drive wheels 8 of the laden carriage spin under acceleration or braking.

The guide plate 20 serves for guiding these two lifting pins. The drive 12 for the right drive wheel, having he drive wheel 21 thereof, the timing belt 23, and the guide and tension roller 22 are referenced on the right side in FIG. 4.

The connection between the central lifting pin 10 and the two other lifting pins 15 and 13, and the docking cross beam 5 and the openings thereof of the docking cross brace 6 is shown in the upper region of FIG. 4. The central lifting pin 10 is connected to the carriage by way of the contact plate 19 and the contact plate 18.

Figure 5:
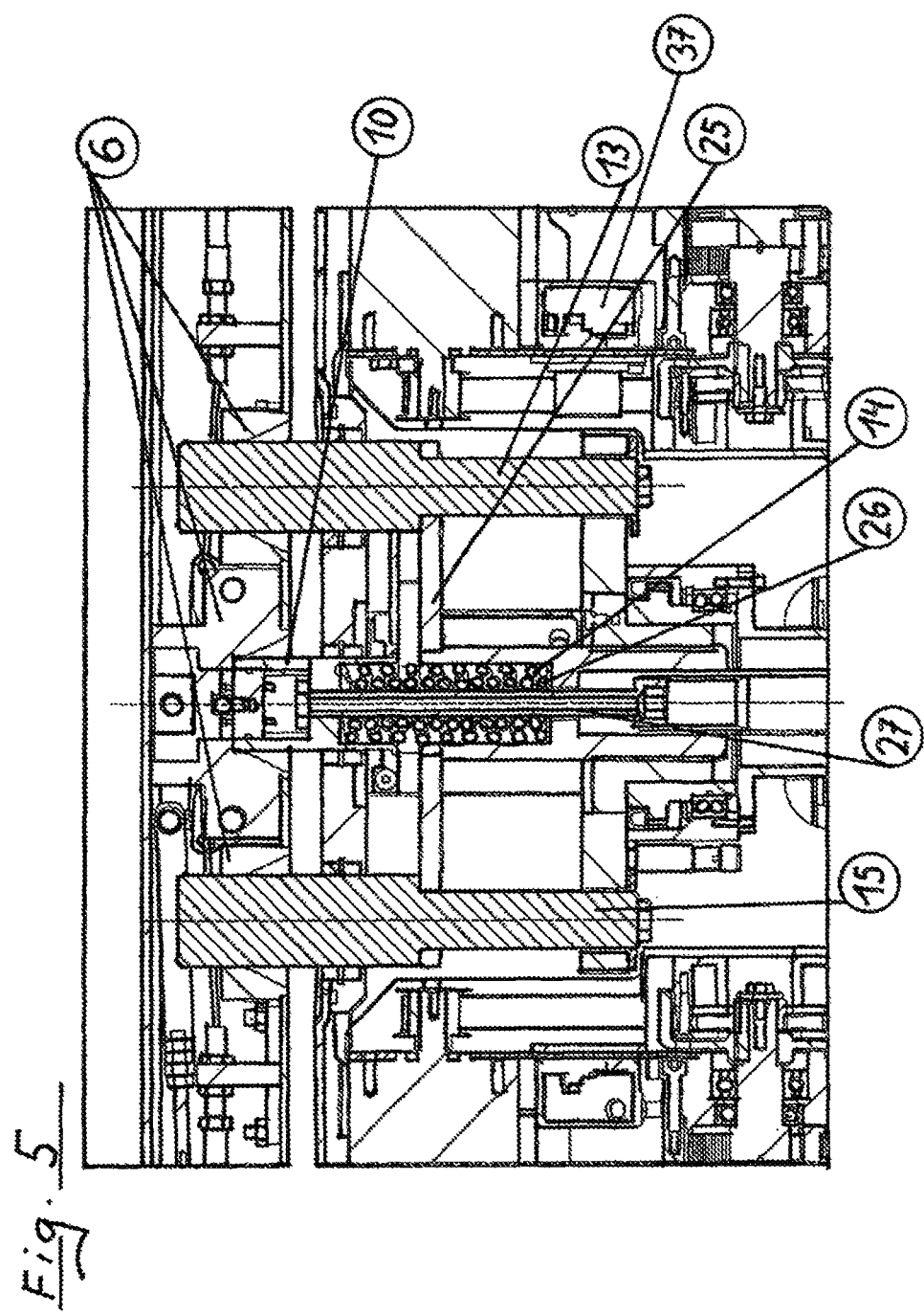
FIG. 5 shows a cross section of the docking region in the case of a comparatively high payload.

FIG. 5 shows a cross section of the docking region as per FIG. 4, in a position which corresponds to a load on the carriage between 400 kp and approximately 1000 kp. The lifting pins 10, 15, and 13, the pressure plate 25, the guide tube 27, and the docking cross brace 6 can also be seen here.

Here, the external pressure spring 14 and the internal pressure spring 26 are stressed, the spacing between the pressure plate 25 and the housing for the lifting spindle therefore being larger than in the illustration of FIG. 4.

In the region of the right drive wheel a rotary encoder 37 of this drive wheel is additionally referenced.

Figure 6:
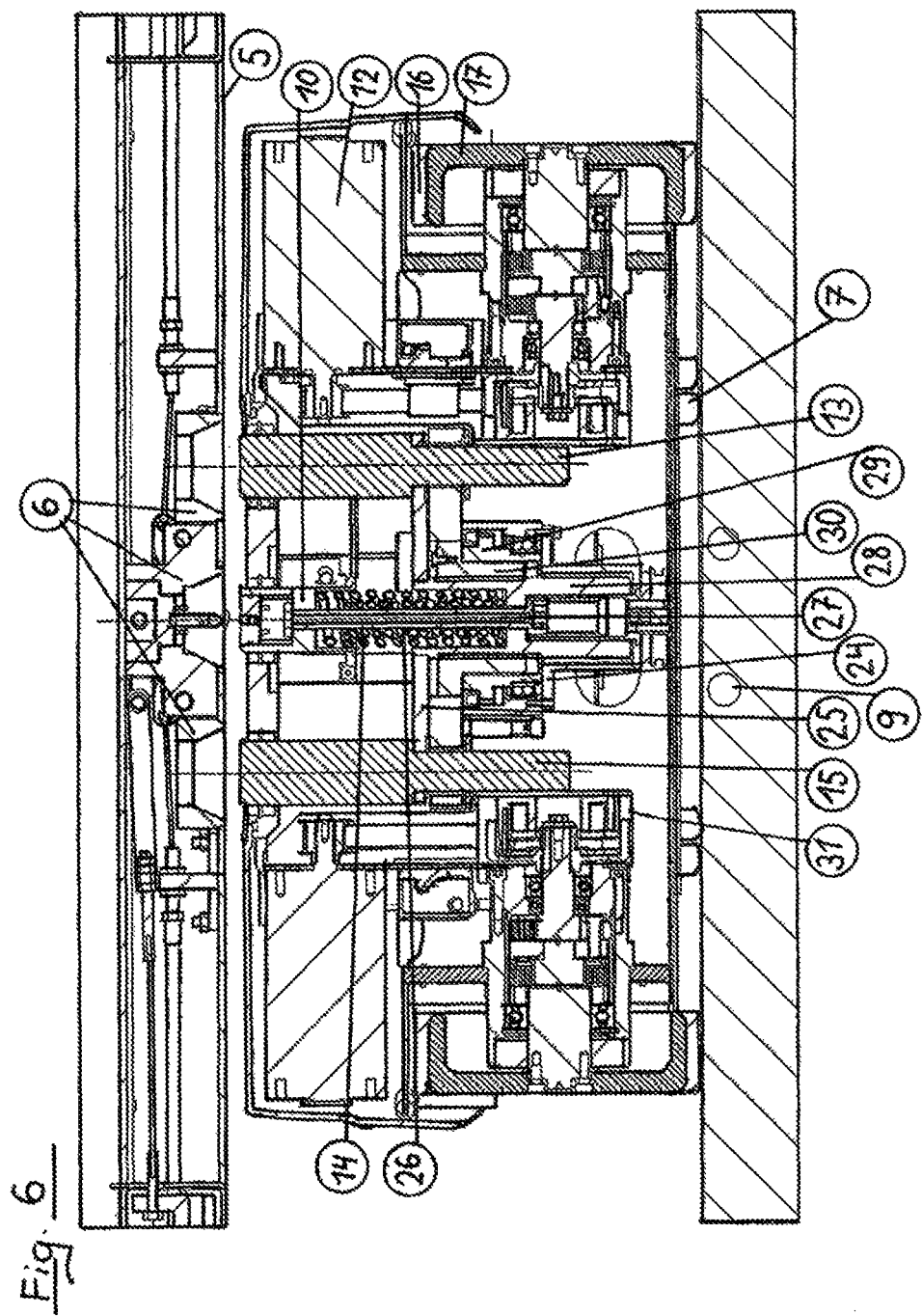
FIG. 6 shows a cross section of a transport vehicle and of a carriage.

FIG. 6 shows a cross section of a transport vehicle on the floor and of a carriage disposed thereabove, in particular showing the assignment of the connection elements between the transport vehicle and the carriage.

The central lifting pin 10 having the external pressure spring 14, the internal pressure spring 26, and the guide tube 27 which runs concentrically with the longitudinal axis of these two springs can again be seen in the center. The gear wheel 29 drives the spindle nut 30 which, by way of the internal thread thereof, enables the lifting spindle 28 to be vertically moved in the housing 24 thereof, and which by means of the pressure plate 25 is able to press the left lifting pin 15 and the right lifting pin 13 into the openings of the docking cross brace 6, lying above said lifting pins in the docking cross beam 5, so that said lifting pins engage in said openings.

The drive-wheel rim 17 and the drive-wheel tire 16 having the drive 12 are referenced on the right drive wheel. Two induction lines 9 in the floor are illustrated, and the support wheels 7 on the floor are referenced. In the region of the left drive wheel a timing-belt wheel 31 for driving this drive wheel can be seen. In general terms, the following should be stated in the context of the transport vehicle described:

The installation of a camera 11 on the vehicle housing for detecting the floor structure serves for determining the speed of the transport vehicle and in conjunction with a rotary encoder (37) on each drive wheel (8) enables the slippage on each drive wheel (8) to be calculated.

In one particular design embodiment the vehicle housing contains a sensor (not referenced in the figures) for measuring acceleration.

This sensor, in the case of an expedient brief and temporally limited acceleration from standstill, enables the acceleration to be measured and thus, while considering specific parameters, allows conclusions relating to the accelerated mass to be drawn.

The weight of the payload of the carriage may then be determined therefrom.

Knowledge of the weight of the payload of the carriage is inter alia important for evaluating the slippage of the drive wheels and, in conjunction with the determinations of the camera 11 for detecting the floor structure, for selecting the drive wheel tires. Knowledge of the weight of the payload of the carriage furthermore serves for estimating the drive output required for the transportation of a laden carriage.

Controlling the complex motion procedures and signal processing of the sensors used requires a special control program.

LIST OF REFERENCE SIGNS

1 Carriage
2 Laser scanner
3 Caster
4 Transport vehicle
5 Docking cross beam
6 Docking cross brace
7 Support wheel
8 Drive wheel
9 Induction line
10 Central lifting pin
11 Camera for detecting the floor structure
12 Drive for a drive wheel
13 Right lifting pin
14 External pressure spring
15 Left lifting pin
16 Drive wheel—tire
17 Drive wheel—rim
18 Contact plate of carriage
19 Contact plate of lifting pin
20 Guide plate for the left and right lifting pin
21 Drive wheel for the timing belt 23
22 Guide and tension roller for the timing belt 23
23 Timing belt
24 Housing for the lifting pin 28
25 Pressure plate for the left and right lifting pin
26 Internal pressure spring
27 Guide tube for the internal pressure spring 26 and the external pressure spring 14
28 Lifting spindle
29 Gear wheel for driving the spindle nut 30
30 Spindle nut
31 Timing-belt wheel for driving a drive wheel
32 Driving motor for the lifting spindle 28
33 Induction current pick-up
34 Thrust bearing of the spindle nut 39
35 Reduction gear wheels
36 Drive sprocket
37 Rotary encoder for a drive wheel 8
38 Vehicle housing

The invention claimed is:

1. A driverless transport vehicle for transporting heavy loads on a carriage that is movable on casters, the driverless transport vehicle comprising:
   a) a vehicle housing (38) having a central lifting pin (10), a left lifting pin (15), and a right lifting pin (13) for receiving and transporting the carriage (1) by means of a docking cross beam (5) which is integrated in the carriage (1), having two drive wheels (8) which, each on a dedicated mounted rotation axle, are separately driven on either side of the center of the vehicle housing (38) by one drive (12) each, wherein a rotary encoder (37) is provided on each drive wheel (8), and wherein support wheels (7) in each case in pairs are provided on the front side and on the rear side of the vehicle housing;
   b) a drive motor (32) for driving a lifting spindle (28) which by means of a pressure spring (14) presses the central lifting pin (10) into a central opening of the docking cross beam (5), and by means of a pressure plate (25) presses the left lifting pin (15) and the right lifting pin (13) into respective further openings of the docking cross beam (5);
   c) an induction current pick-up system (33) for supplying energy to the driverless transport vehicle;
   d) at least one laser scanner (2) in an external region of the vehicle housing,
   wherein the driverless transport vehicle is configured to transport the heavy loads on the carriage that is movable on the casters.

2. The driverless transport vehicle as claimed in claim 1, wherein the pressure spring (14) concentrically encloses a further, internal pressure spring (26) which enables high contact pressure on the carriage (1).

3. The driverless transport vehicle as claimed in claim 1, wherein the docking cross beam (5) has a docking cross brace (6) which enables receiving of the carriage (1) in a position of the driverless transport vehicle that is rotated about a right angle.

4. The driverless transport vehicle as claimed in claim 1, further comprising a sensor for measuring acceleration of the driverless transport vehicle.

5. The driverless transport vehicle as claimed in claim 4, wherein the sensor is configured to measure the acceleration of the driverless transport vehicle after an expedient brief and temporally limited acceleration from standstill, and wherein a mass of the heavy load can be determined from the measured acceleration.

6. The driverless transport vehicle as claimed in claim 1, further comprising a camera (11) for detecting a floor structure.

7. The driverless transport vehicle as claimed in claim 6, wherein the camera (11) is configured to determine a speed of the driverless transport vehicle, and wherein the camera

(11) in conjunction with the rotary encoder (37) on each drive wheel (8) enables a calculation of slippage on each drive wheel (8).

8. The driverless transport vehicle as claimed in claim 1, wherein the induction current pick-up (33) is configured to receive energy supplied by an inductive line installed in a floor.

\* \* \* \* \*